(No Model.)

H. STENDER.
PHOTOGRAPHIC COPYING CAMERA.

No. 606,594. Patented June 28, 1898.

Witnesses
Percy Ingman.
E. A. Waterman

Inventor
Herman Stender
by Townsend Bros.
his attys.

UNITED STATES PATENT OFFICE.

HERMAN STENDER, OF PROSPECT PARK, CALIFORNIA, ASSIGNOR OF ONE-HALF TO HENRY P. WARE, OF SAN GABRIEL, CALIFORNIA.

PHOTOGRAPHIC COPYING-CAMERA.

SPECIFICATION forming part of Letters Patent No. 606,594, dated June 28, 1898.

Application filed July 13, 1897. Serial No. 644,449. (No model.) Patented in Mexico September 8, 1896, No. 907.

*To all whom it may concern:*

Be it known that I, HERMAN STENDER, a subject of the German Emperor, residing at Prospect Park, in the county of Los Angeles and State of California, have invented new and useful Improvements in Negative-Enlarging Cameras and Cameras for Printing from Negatives or Transparencies, of which the following is a specification.

My invention relates to improvements in enlarging-cameras and processes of printing from negatives or transparencies, for which I have obtained a patent in Mexico, dated September 8, 1896, No. 907, and have made application for Letters Patent of the United States, Serial No. 644,308, filed July 12, 1897.

While my former invention is adapted for successful use with perfect negatives, I discovered in practice that it is very difficult to obtain a small negative which possesses no defects, and oftentimes the negative which gives the desired pose and expression is either over or under timed pyro or color stained, and therefore a perfect positive or other print cannot by the former method be secured therefrom.

The object of my present invention is to provide means whereby I can correct the printing qualities of an under or over timed pyro or color stained negative, or of a transparency in case it is defective in the plastic appearance of the objects photographed, so as to produce from a defective negative, which without my invention cannot be utilized, enlargements or prints of the highest degree of perfection.

A further object of my invention is to provide simpler, cheaper, and more effective means for regulating the position of the image upon the ground glass.

Another object of my invention is to provide improved means for vignetting prints.

The accompanying drawings illustrate my invention.

Figure 1:
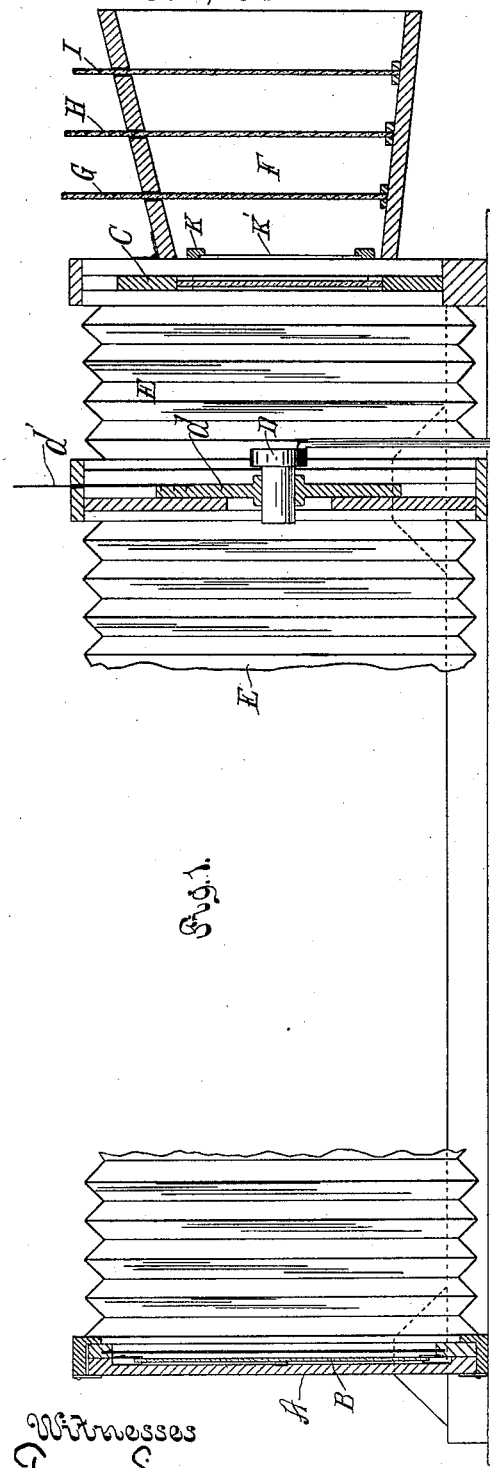
Figure 2:
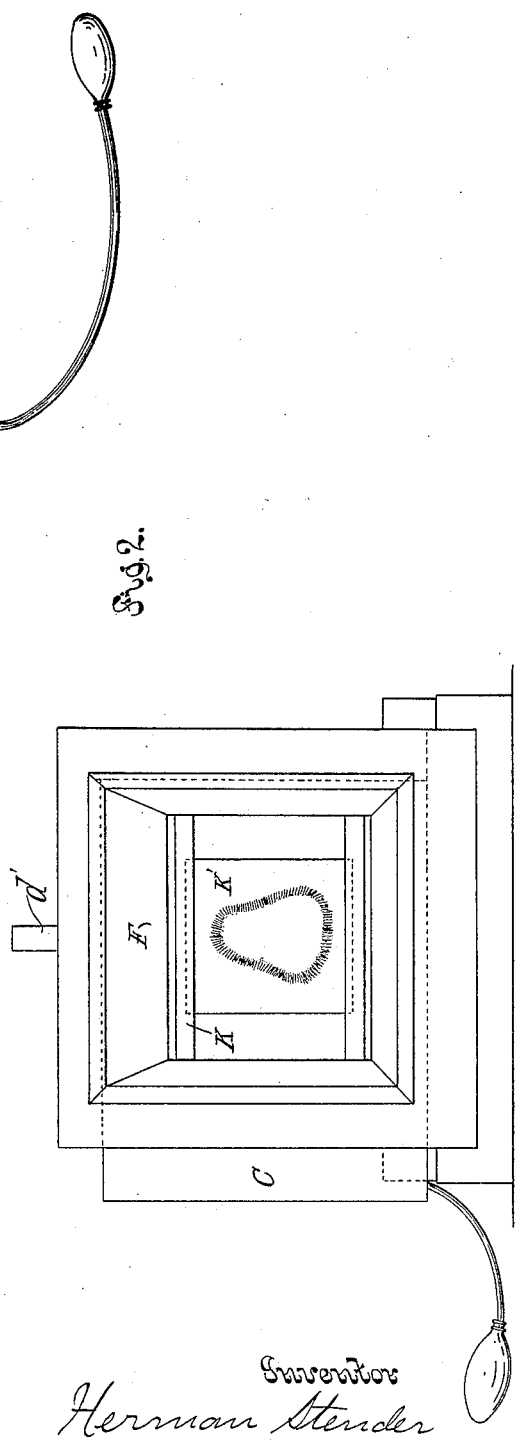

Figure 1 is a fragmental sectional view illustrating a camera embodying my invention. Fig. 2 is a front elevation of the same, showing the colored screens removed from the light-diffusing chamber.

In the drawings, A represents a plate-holder within which may be arranged the sensitive plate B, which is to form the large negative.

C is a negative or transparency holder which is arranged in the front end of the camera and is adjustable transverse the camera, and D is a lens arranged between the holder B and the holder C. The usual bellows connection E is arranged between the plate-holders and the lens to allow adjustment of the various parts relative to each other. The lens is mounted in a frame $d$, which is vertically adjustable and is operated by means of the projecting tongue $d'$. Thus by adjusting the lens vertically and adjusting the transparency-holder tranversely the image may be thrown on any desired portion of the plate in the plate-holder.

With the exception of the adjustable feature of the lens my enlarging-camera is, as far as described, the same as that described in my former application.

In front of the negative or transparency holder C is the light-diffusing chamber F. Within this light-diffusing chamber I arrange screens G, H, and I of different colors—white, red, yellow, and blue—by preference the screens G and I being white and the screen H being of some suitable tint of red, yellow, or blue, the reason of which will be hereinafter explained.

I will now explain the operation of my enlarging-camera and describe why I am enabled to produce therewith a large negative of any desired size and without any of the well-known faults of direct photography.

As I have explained in my former application, the principal difficulty in enlarging negatives heretofore has been the tendency of the enlarged negative to take flat—that is to say, there are no half-tones in the enlarged negative. I have discovered that when a transparency is deficient in respect to the plastic appearance of the objects photographed by tinting the light passing through the transparency to suit the quality thereof the transparency can be filled out or rounded, so that the image thrown upon the ground glass will appear as clear and distinct as though the person were looking directly at the object photographed. The explanation of this I will now give. There are three colors which, properly combined, will produce all possible shades and effects. These colors are red, yellow, and blue. The whiter the light which acts upon a light sensitive plate the quicker it will make its impression. Red and yellow lights will not act upon the sensitive plate at all if they are intensified to a certain extent. Blue light, on the other hand, acts in the other direction. It destroys the action of the orange or non-actinic light upon a plate. By inserting a blue screen in my light-diffusing apparatus in front of the camera I assist a too-contrasty or yellow-stained negative in its printing quality by changing its color. On the contrary, by inserting a yellow, red, or orange screen I materially arrest the too-quick-printing quality of a too-flat, too-thin, or too-transparent negative. If the small negative is perfect, white screens as used in my former invention are sufficient.

In using my improved camera, the transparency being provided in the manner described in my former application, it is placed within the transparency or negative holder c and slipped into the front of the camera, as shown in Fig. 1. The operator then adjusts the lens and plate holder to give the image the desired size upon a plate in the plate-holder. The colored screens G, H, and I are arranged in the light-diffusing chamber in such series that they will tint the light passing through the transparency to suit the printing quality of the transparency—that is to say, if the transparency is thin I insert a yellow, red, or orange screen, thus arresting the too-quick-printing quality of the transparency. If the transparency is thick or yellow-stained, I insert a blue or white screen. If a different light is needed to bring out the full strength of the transparency, the colored screens may be arranged to give the desired tint of light. Everything being in readiness, the plate-holder A, having a sensitive plate B therein, is arranged in position in the camera, as shown in Fig. 1, and the impression is taken. The impression may be taken either by short or long exposure, just as the transparency may require it, the light which passes into the camera being tinted to bring out the full strength of the transparency. By passing the light through the various screens it is immaterial to what light the camera is exposed. It may be placed where the sunlight can strike a portion only of the front screen, or it may be placed entirely in the shade or entirely in the sunlight. If it be placed so that a shadow will rest on the upper portion only of the screen and the sunlight on the lower portion thereof, the light is reflected from the first screen to the second and from the second to the third, by this time becoming so evenly diffused that in looking through the camera one cannot distinguish which portion of the front screen is exposed to the strong light.

Another important feature of my invention is that I am enabled to vignette negatives or prints in any desired shape and without having any sharp line to ruin the print or negative. This improvement consists in arranging in front of the negative or transparency holder C and between it and the screens a vignette-holder K, within which may be arranged a vignette K'. (Shown in Fig. 2.) This vignette is thus arranged in front of the transparency, and the diffused light which comes through the various screens passes through the opening in the vignette without casting any uneven shadow upon any portion of the plate. The central portion of the plate will take strong and clear, but the other portions of the plate will take fainter and fainter, the outer portions thereof being entirely obliterated, thus producing upon bromids the vignette which it has heretofore been necessary to produce by continually moving a vignette between the negative and the paper in order to prevent sharp lines. This vignetting as formerly practiced requires a very experienced operator to secure good results, and even then the loss of prints from the improper vignetting is so great as to be a matter of serious consequence.

In producing the transparency the operator can judge of the printing quality of the negative and can tint the light to suit the negative—that is to say, if the negative is so thin that the lights and shades when printed with a white light will print almost equally quick by inserting a yellow, red, or orange screen the printing quality is materially changed. This is for the reason that through the thin places of the negative the actinic and non-actinic rays of light pass through the negative with almost equal facility. Upon the contrary, where the negative is thicker both the actinic and non-actinic rays are arrested in their course, and the tint is consequently intensified at these points to such an extent that the printing proceeds much slower in proportion than does the printing of the thinner portions of the negative.

In practical experience I have determined that the proportionate printing qualities of the lights and shades may, by a proper regulation of the tints of the light used in printing, be varied, if necessary, so that where the thin portions of the negative in printing quality can be compared to one the thick portions of the negative will in proportion thereof be as five. Any intermediate proportions may be secured by a proper tinting of the printing-light. If a white light is used, the printing qualities of the thick and thin portions of the negative always maintain the same proportions relative to each other without reference to the intensity of the light used, and for this reason I found that my former invention, in which I employ only white screens, is capable of only limited use. My present invention gives a range which enables me to secure perfect prints from negatives which cannot otherwise possibly be utilized.

In ordinary practice the inner and outer screens G and I are perfectly white and the middle screen H is tinted to the color and intensity deemed requisite for the work at hand.

It is to be understood that the purpose of the tinted screen is to regulate the actinic quality of the white light and that the order of arrangement may be changed without departing from my invention.

Now, having described my invention, what I claim as new, and desire to secure by Letters Patent, is—

1. An enlarging-camera provided with a negative or transparency holder; a vignette arranged in front of such holder; and a light-diffusing chamber arranged in front of the vignette.

2. An enlarging-camera comprising a plate-holder; a lens arranged between the plate-holder and the negative or transparency holder; a vignette-holder arranged in front of the negative or transparency holder; and a light-diffusing chamber arranged in front of the vignette-holder.

3. In a camera, the combination of a transversely-movable negative-holder and a lens vertically movable independently of the body of the camera.

4. In an enlarging-camera, the combination of a transversely-sliding negative-holder; a plate-holder; and a vertically-adjustable lens between the negative-holder and the plate-holder.

5. In an enlarging-camera, the combination of a transversely-sliding negative-holder; a light-diffusing chamber in front of the negative-holder; a plate-holder; and a vertically-adjustable lens between the negative-holder and the plate-holder, substantially as and for the purpose set forth.

6. In an enlarging-camera, the combination set forth of the negative or transparency holder; the light-diffusing chamber, arranged in front of such holder, and colored light-diffusing screens arranged in the chamber.

7. An enlarging-camera comprising a light-diffusing chamber provided with a plurality of light-diffusing screens, one of which is of a tint to regulate the actinic quality of the white light; a plate-holder; a negative-holder between the light-diffusing chamber and the plate-holder; and a lens between the negative-holder and the plate-holder.

8. A camera provided with a negative-holder and a plate-holder; a lens between the negative-holder and the plate-holder; a light-diffusing chamber in front of the negative-holder and provided with two white screens; and a tinted screen arranged between the two white screens to regulate the actinic quality of the white light.

HERMAN STENDER.

Witnesses:
ALFRED I. TOWNSEND,
F. M. TOWNSEND.

It is hereby certified that in Letters Patent No. 606,594, granted June 28, 1898, upon the application of Herman Stender, of Prospect Park, California, for an improvement in "Photographic Copying-Cameras," an error appears in the printed specification requiring correction, as follows: In the heading of the specification the words and figures "Patented in Mexico September 8, 1896, No. 907," should be stricken out; and that the said Letters Patent should be read with this correction therein that the same may conform to the record of the case in the Patent Office.

Signed, countersigned, and sealed this 30th day of August, A. D., 1898.

[SEAL.] WEBSTER DAVIS,
*Assistant Secretary of the Interior.*

Countersigned:
    A. P. GREELEY,
        *Acting Commissioner of Patents.*